United States Patent [19]
Pinder et al.

[11] Patent Number: 5,742,677
[45] Date of Patent: Apr. 21, 1998

[54] INFORMATION TERMINAL HAVING RECONFIGURABLE MEMORY

[75] Inventors: Howard G. Pinder, Atlanta; Anthony John Wasilewski, Alpharetta, both of Ga.

[73] Assignee: Scientific-Atlanta, Inc., Norcross, Ga.

[21] Appl. No.: 415,617

[22] Filed: Apr. 3, 1995

[51] Int. Cl.$^6$ .................................................. H04K 1/00
[52] U.S. Cl. ................................. 380/4; 380/21; 380/25
[58] Field of Search ........................... 380/3, 4, 21, 23, 380/25, 30

[56] References Cited

U.S. PATENT DOCUMENTS

| | | |
|---|---|---|
| 4,475,123 | 10/1984 | Dumbauld et al. . |
| 4,530,008 | 7/1985 | McVoy . |
| 4,558,464 | 12/1985 | O'Brien, Jr. . |
| 4,677,467 | 6/1987 | Hayes . |
| 4,677,685 | 6/1987 | Kurisu . |
| 5,003,591 | 3/1991 | Kauffman et al. . |
| 5,093,921 | 3/1992 | Bevins, Jr. . |

*Primary Examiner*—David C. Cain
*Attorney, Agent, or Firm*—Banner & Witcoff, Ltd.

[57] ABSTRACT

An information terminal includes a secure microprocessor and secure non-volatile memory. Data such as authorization data and other service provider related data for subscription information services are certified as to source, and portions thereof decrypted as necessary by the secure processor according to a service provider key and loaded into secure non-volatile memory. The secure data is loaded by multiple service providers or by subscribers themselves, each service provider being adaptably allocated a number of non-volatile storage cells of predetermined length. In this manner, scarce non-volatile memory resources may be conserved and yet made accessible to multiple information service providers upon demand or as requirements change. Once certified by a trusted entity, several information service providers may individually change or modify the reconfigurable memory of the present invention by remote, addressed communication without the intervention of head-end apparatus. Moreover, preferably the service provider signs messages, and may privately encrypt portions of the message, including the authorization data, with its own key and the encrypted data is certified as to source and decrypted upon receipt at the secure microprocessor. In this manner, authorization transactions are protected from service pirates. Moreover, in a similar manner, service acceptance data, such as impulse pay-per-view data, may be signed by an electronic signature of the subscriber, privately encrypted as appropriate with a subscriber provided key and returned to the service provider. Once the service acceptance data is successfully received at a billing computer, the data is erased from secure terminal memory.

24 Claims, 12 Drawing Sheets

| NVSC ITEM | SIZE (BYTES) |
|---|---|
| TYPE/STATUS | 1 |
| RESERVED | 1 |
| DATA | 36 |
| NEXT NVSC POINTER | 2 |

FIG.4A

| BIT 7 | 6 | 5 | 4 | 3 | 2 | 1 | BIT 0 |
|---|---|---|---|---|---|---|---|
| STATUS | | | | TYPE | | | |

FIG.4B

| TYPE VALUE... | INDICATES THIS TYPE OF DATA | AND EACH NVSC CAN HOLD UP TO... |
|---|---|---|
| 0000 | ERROR - THIS NVSC BLOCK IS INVALID, AND SHOULD NOT BE USED. | |
| 0001 | LARGE TIER MAP (256 TIERS, BIT-MAPPED INTO 32 BYTES, WITH 2 BYTES FOR SP NUMBER, AND 2 BYTES FOR TS ID NUMBER) | 1 |
| 0010 | SMALL TIER MAP(S) (16 TIERS EACH, BITS-MAPPED INTO 2 BYTES, WITH 2 BYTES FOR SP ID, AND 2 BYTES FOR TS ID) | 6 |
| 0011 | PORTION OF A BIT-MAPPED PROGRAM AUTHORIZATION MAP (4096 CHANNELS) | 1/16 |
| 0100 | INDIVIDUAL PROGRAM AUTHORIZATION(S) (2 BYTES FOR PROGRAM NUMBER, 2 BYTES FOR SP ID, AND 2 FOR TS ID) | 6 |
| 0101 | MSK FOR A SERVICE PROVIDER (128 BITS, EVEN/ODD) | 1 |
| 0110 | IMPULSE PAY PER VIEW EVENT (2 BYTES FOR EVENT NUMBER, 2 FOR SP ID, AND 2 FOR TS ID) | 6 |
| 0111 | TBD | |
| 1000 | TBD | |
| ... | ... | |
| 1111 | EMPTY, AND AVAILABLE FOR USE | |

FIG. 4C

| STATUS VALUE | MEANING |
| --- | --- |
| 0000 | ERROR – THIS NVSC BLOCK IS INVALID, AND SHOULD NOT BE USED. |
| 1000 | CHANGING – ANOTHER BLOCK IS BEING WRITTEN WHICH SUPPLANTS THE INFORMATION IN THIS BLOCK. |
| 1100 | VALID – THIS BLOCK IN USE, AND ITS CONTENTS ARE VALID |
| 1110 | WRITING – THIS BLOCK IS BEING WRITTEN |
| 1111 | EMPTY, AND AVAILABLE FOR USE |
| OTHERS | NOT VALID |

FIG.4D

| NVSC TYPE: | DESCRIPTION | # REQ'D |
|---|---|---|
| SERVICE PROVIDER (SP) DESCRIPTOR | A FULL DESCRIPTION OF A PARTICULAR SP, CONTAINS THE PUBLIC KEY HASH (16 BYTES), SERVICE PROVIDER ID (2 BYTES), NVSC POINTER (2 BYTES), SP CHARACTERISTICS (8 BYTES), AND UP TO 2 CHANNEL AUTHORIZATIONS (8 BYTES). | 1 |
| MSK FOR A SERVICE PROVIDER | EACH SERVICE PROVIDER HAS ITS OWN MSK, WHICH ENCRYPTS ECMs. THERE IS AN EVEN AND ODD MSK, EACH 16 BYTES LONG. | 1 |
| LARGE TIER MAP | ALLOWS SP TO AUTHORIZE CHANNEL BASED ON 256 TIERS. THE TIERS ARE BIT-MAPPED INTO 32 BYTES. THERE ARE 2 BYTES FOR SP NUMBER, AND 2 BYTES FOR TS ID. | 1 |
| LARGE PROGRAM MAP | A BIT-MAPPED PROGRAM AUTHORIZATION MAP FOR 4096 CHANNELS. REQUIRE ONE BIT PER CHANNEL, PLUS OVERHEAD. | 17 |
| SMALL PROGRAM MAP | A BIT-MAPPED PROGRAM AUTHORIZATION MAP FOR 256 CHANNELS. REQUIRE ONE BIT PER CHANNEL (32 BYTES), 2 BYTES FOR SP ID, AND 2 BYTES FOR TS ID. | 1 |
| INDIVIDUAL PROGRAM AUTHORIZATIONS (8) | USED BY A SINGLE SP TO AUTHORIZE UP TO 8 BROADCAST CHANNELS OR PPV EVENTS. EACH PROGRAM REQUIRES 2 BYTES FOR THE CHANNEL NUMBER AND 2 BYTES FOR THE TS ID. | 1 |
| IMPULSE PAY PER VIEW EVENTS (8) | USED BY A SINGLE SP TO STORE IPPV EVENTS. EACH EVENT REQUIRES 2 BYTES FOR THE EVENT NUMBER, AND 2 BYTES FOR LENGTH. | 1 |

FIG.5

|  | EX #1: EXAMPLE FROM FIGURE 6 | EX #2: USWEST OMAHA TRIAL | EX #3: DIRECT TV MODEL | EX #4: SAVANNAH MODEL | EX #5: HEAVILY INTERACTIVE | EX #6: LOTS OF LITTLE SPs |
|---|---|---|---|---|---|---|
| TOTAL NUMBER OF SERVICE PROVIDERS | 3 (6 NVSC'S) | 23 | 2 | 5 | 35 | 35 |
| SPs WITH LARGE TIER MAPS |  | 14 | 2 | 4 | 5 | 1 |
| SPs WITH LARGE CHANNEL MAPS | 1 (17 NVSC'S) |  |  | 1 |  |  |
| SPs WITH SMALL CHANNEL MAPS |  |  |  |  |  |  |
| 8 CHANNEL AUTHORIZATIONS | 1 | 9 (72 TOTAL) | 20 (160 TOTAL) | 10 (80 TOTAL) | 5 (40 TOTAL) |  |
| 8 IPPV EVENTS |  |  | 6 (48 TOTAL) | 10 (80 TOTAL) |  |  |
| EMPTY NVSCs (FROM A TOTAL OF 80) | 55 | 11 | 48 | 29 | 0 | 9 |

FIG.7

INFORMATION TERMINAL HAVING RECONFIGURABLE MEMORY

BACKGROUND OF THE INVENTION

1. Technical Field

The present invention generally relates to an information terminal having a reconfigurable memory and, more particularly, to a subscription information system including such a subscriber terminal unit with a secure authorization memory that is reconfigurable under control of multiple information service providers via a central location.

2. Description of the Related Art

The volume of information and number of features being made available to subscribers in information systems such as subscription television systems are continuously increasing. For example, the advent of optical fiber networks and links to telecommunication networks enables an almost limitless supply of information and features to be provided to subscribers. Already subscription television systems are being used for addressed message transmissions, pay-per-view programming, impulse pay-per-view programming, favorite channel features, and parental control. Cable television system operators may also provide text services such as news articles, sports scores, stock market quotations, and weather reports. Relatively new features such as video game delivery, digital audio services, wide area network access, home shopping, travel reservations service, home banking, energy management, video conferencing, burglar and fire alarm services and other such services are also being provided.

Each of the various services may be provided by a different service provider, for example, energy management services from a public utility (gas/electric/oil), a digital audio service from a digital audio service provider, game service from a game service provider, stock ticker services from a ticker service provider, home shopping services from a catalog vendor, movie services from a video-on-demand service vendor, and so on. Each of these services may offer subscription services at a charge and so require the ability to authorize or deny service to an individual subscriber. Moreover, certain of these service providers may require the ability for a subscriber to authorize their services impulsively; for example, a subscriber should be able to view a movie of their choice without having to preorder the movie in advance from the service provider.

Such impulse pay-per-view services typically require a return path to the service provider to report on information services purchased. In direct-to-home, direct broadcast satellite, cable television or other known systems, a telephone return line is typically used. Telephone return paths are described by U.S. Pat. Nos. 4,792,848; 5,053,883 (terminal polling method); and 5,270,809 among others. In coaxial cable and optical fiber systems and combinations thereof, the cable may provide a return path, for example, at radio frequency. In one such system described by U.S. Pat. Nos. 5,109,286; 5,142,690; 5,155,590; 5,225,902; 5,235,619; 5,251,324; and 5,255,086, one or more bands of upstream channels from a subscriber to a head end are utilized. Data channels are selected to avoid noisy channels or bands. Uniquely encrypting data at a plurality of transmission sites for transmission to a reception site are described by U.S. Pat. No. 5,341,425.

All such services are preferably protected from would-be service pirates. In the past, scrambling and encryption techniques have been generally employed to protect the offered services from piracy. In order to provide such service protection, manufacturers of, for example, cable television terminal equipment have included microprocessors and non-volatile memories in which an authorization memory may be maintained and updated with new accepted services and the like. While the transmission of services and addressed commands may be protected from pirates, pirates have generally found ways to compromise services, for example, by obtaining access to the non-volatile memories. Such systems of the prior art, however, failed to provide access to multiple service providers who wished to market their services differently. It was always assumed that there was a single vendor for all the services offered such as cable television services. Alternatively, each service provider separately accessed separate terminal units over separate data communications channels from the service providing channel or channels.

One solution to providing secure terminal authorization is to transmit authorization data in encrypted format requiring decryption for the data to be in intelligible form. Presently, it is known to utilize so-called public key/private key encryption systems and algorithms, two of which are known as RSA, the last initials of the inventors named on the patents, and digital signature algorithm (DSA) as described by U.S. Pat. Nos. 4,405,829 and 5,231,668, respectively.

Moreover, as encryption and scrambling became essential for preserving services from pirates, it has become desirable to assure that related authorization messages and the like are certified as to source. For example, in copending U.S. application Ser. No. 08/306,447 of Houser et al. entitled "Electronic Document Verification System and Method" there is described a process whereby a document is certified or verified by embedding a security object in a signed electronic document. A verification processor certifies or verifies the "signature" in the electronic document. The document itself and/or the security information may be encrypted to protect the security information or they may not. Moreover, the security information may include a document digest and/or a signature digest, the former including a hash value, the latter, a secret serial number unique to each security object.

Cable television equipment manufacturers have solved the problem of limited memory capacity by providing expansion memories, for example, in the form of so-called smart cards including such memories. Generally, as memory requirements increased, so did the size of the memories made available. For example, U.S. Pat. No. 5,367,571 to Bowen et al. issued November, 1994, describes a subscription terminal with an expansion slot adapted to received such a smart card including programmable memory. The memory, for example may be utilized for special graphics features, control software or other features. Related copending application Ser. No. 07/983,909 filed Dec. 1, 1992, entitled "Reprogrammable Subscriber Terminal" describes a reprogrammable subscriber terminal in which sixteen pages of 64 bytes capacity each of EEPROM memory can be programmed from a head-end.

One example of a prior art reconfigurable terminal is described by U.S. Pat. No. 5,003,591 to Kauffman et al. This patent describes a cable television converter with remotely modifiable functionality. Firmware may be downloaded over a cable television network. Nonvolatile memory is coupled to a processor for storing a default operating program in the event no firmware is downloaded to the terminal. It is suggested that a procedure for ordering pay-per-view programs can be modified through downloadable firmware or utility meter reading may be provided by adding an asynchronous data port and controlling the retrieval of utility data via downloaded firmware.

In information decoder equipment, it is also known to provide decryption via a so-called smart card which is plug-in insertable into the decoder. Smart cards for service decryption purposes are described by U.S. Pat. Nos. 5,029,207 and 5,237,610.

None of the above-described references describe any concern for conserving valuable non-volatile memory or do they propose specific implementation solutions for responding to varying needs and requirements of multiple service providers in an efficient manner. It would be clearly desirable if multiple service providers were able to individually access and utilize the same memory resource in a subscription information terminal. Moreover, such a memory resource would preferably be secure from service pirates who would want to control their opportunity to obtain free services.

SUMMARY OF THE INVENTION

The present invention involves the inclusion in an information terminal of a memory which may be addressably reconfigured under control of a head-end. Preferably the memory is secure and non-volatile and its access is controlled by a secure processor. Moreover, the secure terminal memory may be separately accessed by multiple service providers so that each may need to utilize only that amount of memory necessary for its purposes. Once a service provider is certified to a subscriber terminal by a trusted entity, as will be explained herein, the service provider communicates messages directly with the subscriber terminal without head-end or trusted entity intervention. Moreover, as service providers and subscribers to their respective offerings change their requirements, memory may be differently allocated and reconfigured via a process known as linked listing. In such a process, memory blocks are returned from an allocated to an empty list status as requirements change.

Thus, according to the present invention, an information terminal comprises a data receiver for receiving commands and data from an entity and from information providers, a processor for interpreting the commands and data, and reconfigurable memory, responsive to the processor, adapted to store a plurality of blocks of data in memory blocks depending on the requirements of information providers, each said information provider being allocated at least one memory block, all unallocated memory blocks being linked in an empty list. Preferably, the memory blocks have predetermined length, for example, on the order of forty bytes including four bytes of status and pointers. One type of memory block points to the next memory block for a service provider, to the first memory block for the next service provider or to an empty list of memory blocks. The memory blocks may comprise service provider descriptive information, including signature data and encryption/decryption keys, large tier maps, large program maps, small program maps, individual program authorizations and subscriber initiated transaction data such as impulse pay-per-view event authorizations among others. In this manner, a scarce resource, namely non-volatile memory of a secure microprocessor, may be reallocated dynamically to meet changing service provider requirements.

These and other features and advantages of the present invention will be better understood from a reading of the following detailed description in conjunction with the accompanying drawings.

BRIEF DESCRIPTION OF THE DRAWINGS

FIG. 4A shows the content of an exemplary basic memory block or non-volatile storage memory cell (NVSC) including a type/status byte; FIG. 4B provides an example for data comprising the type and status byte; FIG. 4C provides an example of type values of the type data; and FIG. 4D provides representative values for the status data.

FIG. 5 is a chart showing definitions of each of a plurality of memory block types provided by way of example.

FIG. 7 is a chart showing the specific memory configuration example of FIG. 6 and alternative examples.

DETAILED DESCRIPTION

Figure 1:
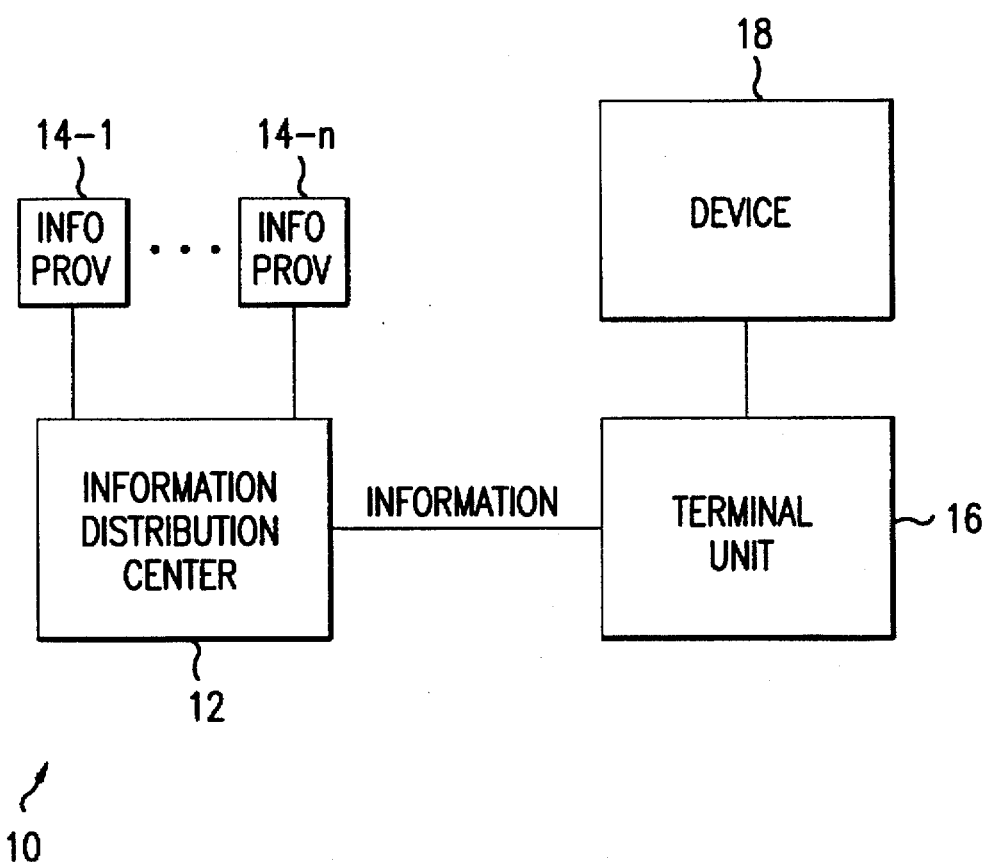
FIG. 1 is a generalized block diagram of an information system in accordance with the instant invention.

FIG. 1 is a generalized block diagram of an information system 10 in accordance with the instant invention. Information system 10 may be analog, digital or represent a combination of analog and digital technologies. Information system 10 includes an information distribution center 12 which receives information from one or more remotely located information service providers (SP) 14-1, . . . , 14-n and supplies or broadcasts this information to a terminal unit 16. "Information" as used herein includes, but is not limited to, analog video, analog audio, digital video, digital audio, text services such as news articles, sports scores, stock market quotations, weather reports, electronic messages, electronic program guides, database information, software including game programs, home shopping catalogs, energy management services, alarm services and wide area network data. Alternatively or in addition, information distribution center 12 may locally generate information and supply this locally generated information to terminal unit 16.

According to the present invention, information distribution center 12 may be the premises of a so-called trusted entity for registering information specific to a service provider. In particular, it is assumed that the service providers will each entrust the trusted entity with a key certificate and a public key. The key certificate certifies to the validity of the key. The trusted entity should preserve the information in confidence from other service providers and service pirates. In an initial transaction or two between the trusted entity and the subscription information terminal of a particular subscriber, the trusted entity validates the identity of the service provider to the terminal, their key and communicates a transport data stream identifier over which to expect communications. Messages from the trusted entity to the home communications terminals preferably are signed by the trusted entity and their signature certified by the process described by U.S. application Ser. No. 08/306,447 or other known process. All this information or selected portions thereof may be communicated encrypted and is decrypted by the secure microprocessor of the present invention. Other information about the service provider may be transmitted in the clear (their address, logo and graphics data and the like), but this data is not required for providing or authorizing service to begin. In this manner, authorizations issuing from each service provider to a particular service subscriber may be received, their signatures certified, portions decrypted and data stored in accordance with the service provider's validated public key and the subscriber's personal private key as appropriate.

The information transmitted by information distribution center 12 to terminal unit 16 includes addressed messages including commands and data to be received and interpreted by terminal unit 16. Such commands and data may comprise, for example, commands to store a key certificate for a new service provider from the trusted entity. Preferably said key certificate is retained in non-volatile, secure memory.

The information distribution center follows the first command and data with a command authorizing the terminal to receive messages directly from the service provider. A maximum number of memory blocks of terminal memory to be allocated to that service provider may be specified with the command.

Thereafter, the service provider may communicate with the subscriber terminal directly via addressed communications. Such communications may be provided via the trusted entity as shown in FIG. 2B or via a public or private, switched or non-switched data network or combination of networks as shown in FIG. 2C. The service provider transmits a key, sometimes referred to herein as a multi-session key (MSK), via the information distribution center 12 to the terminal for storage in terminal memory, preferably secure non-volatile memory.

Preferably, subsequent commands from the service provider are commands to provide certain service authorizations, signed with a signature, and optionally encrypted with the subscriber's public key. These commands then are received, decrypted using also the subscriber's private key and authorization data is stored in secure terminal memory.

Figure 2A:
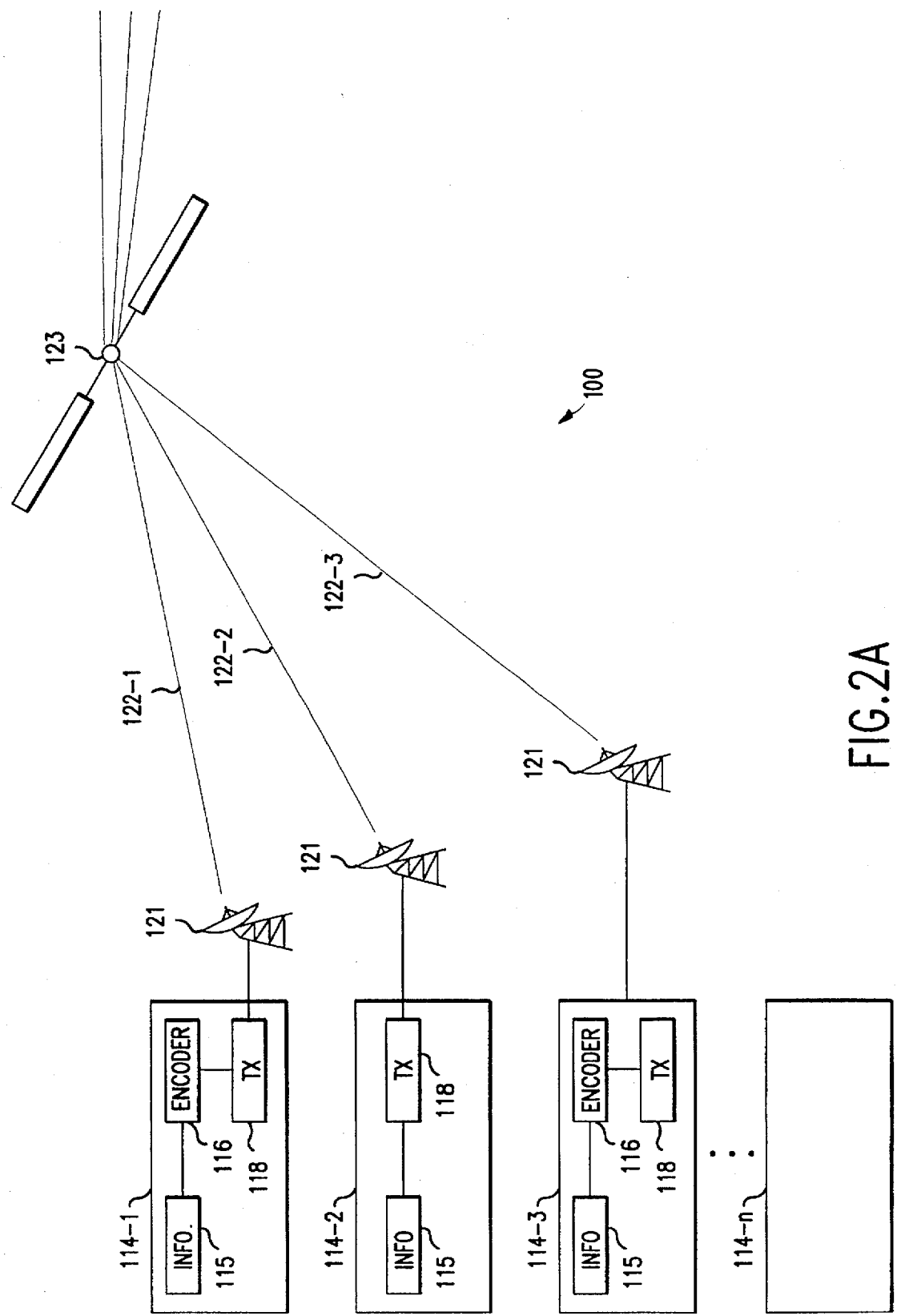
FIGS. 2A, 2B, 2C and 2D are block diagrams of a subscription television system in which the instant invention may be implemented, FIG. 2B defining a combination analog/digital environment into which the present invention may be retrofitted and FIG. 2C defining a digital service providing environment.
Figure 2B:
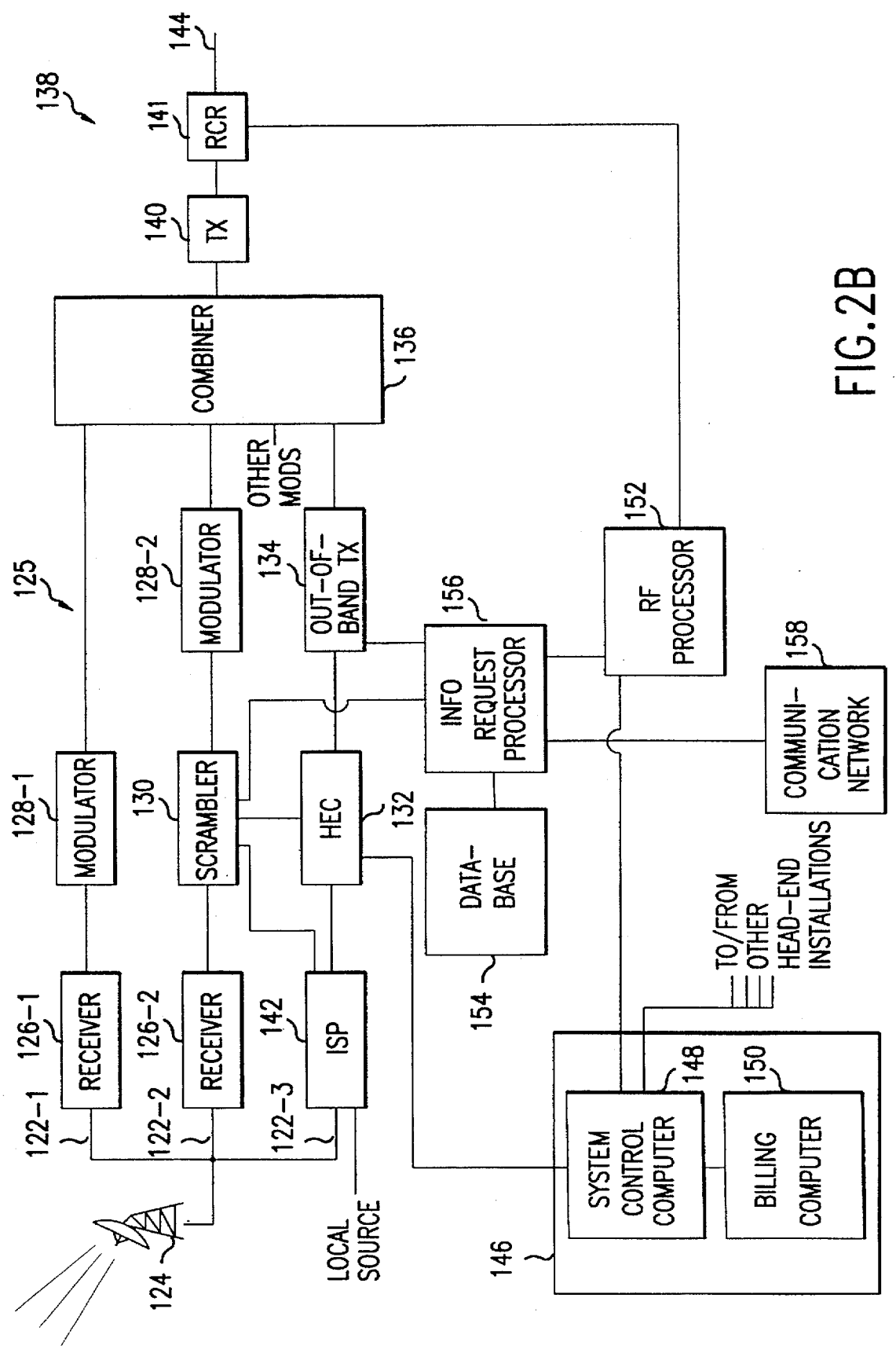
Figure 2C:
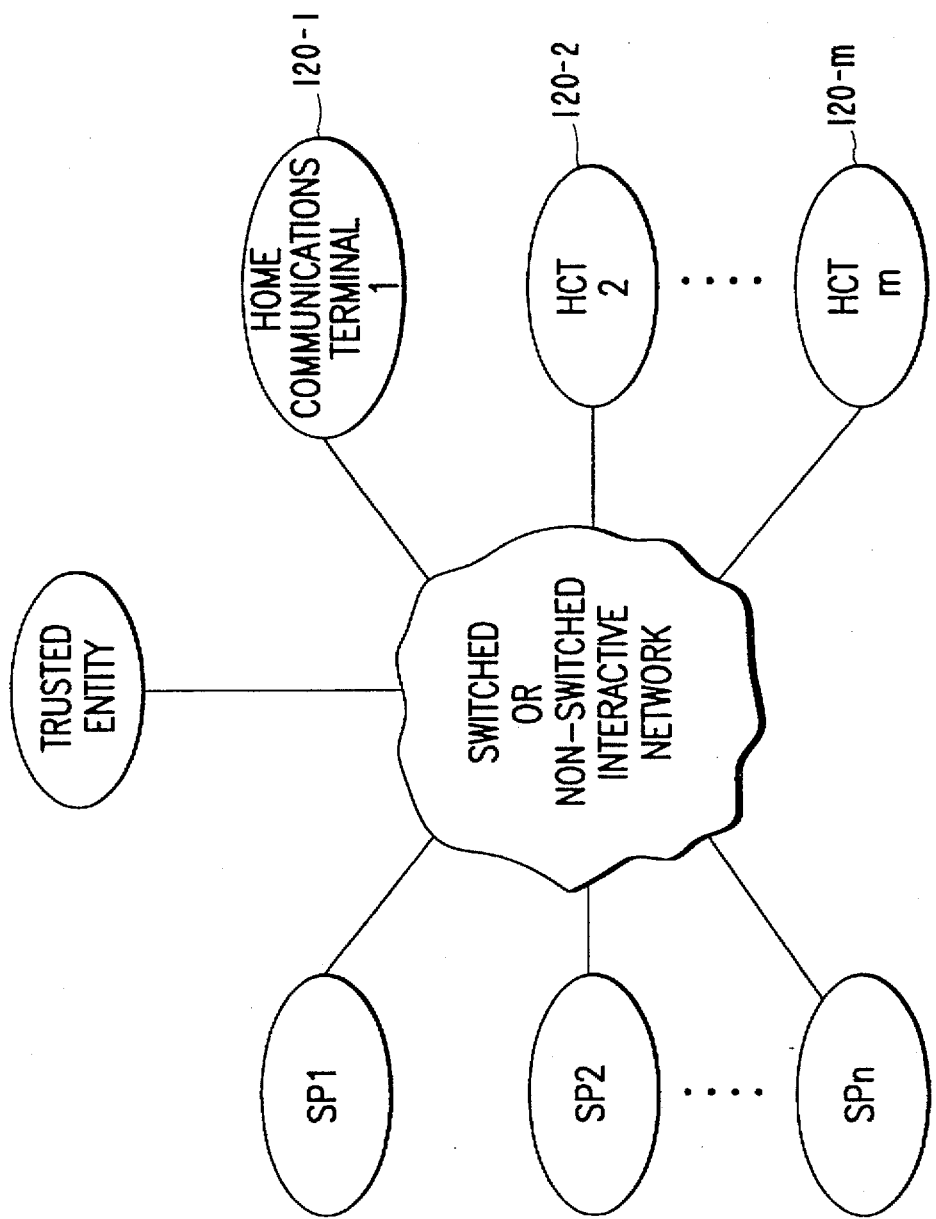

FIGS. 2A, 2B, 2C and 2D are block diagrams of a subscription television system 100 in which the instant invention is incorporated, analog, digital or a combination or analog and digital technologies. It will of course be apparent that the instant invention may be applied to information systems other than a subscription television system and the invention is not limited in this respect. A subscription television system 100 provides information to a plurality of subscriber locations, e.g., 120-1, . . . , 120-m (see FIG. 2C). The information may include, but is not limited to analog video, analog audio, digital video, digital audio, text services such as news articles, sports scores, stock market quotations, weather reports, electronic messages, electronic program guides, database information, software including game programs, and wide area network data. Referring to FIG. 2A, subscription television system 100 includes a plurality of information providers 114-1, . . . , 114-n, each of which may supply one or more of the information types identified above. For example, information provider 114-2 includes an information source 115 for providing an analog television signal to a transmitter 118. Transmitter 118 is coupled to a satellite uplink 121 which transmits an analog television signal 122-2. Information providers 114-1 and 114-3 each provide digital information from an information source 115 to a respective encoder 116 that generates an encoded data stream for transmission. Information source 115 of information providers 114-1 and 114-3 may be a memory such as an optical memory for storing information. If either of information providers 114-1 and 114-3 provides a variety of information, e.g., a plurality of different game programs or different types of text services or a plurality of digital television or audio programs, encoder 116 may multiplex the information to generate a multiplexed data stream for transmission. The data stream from encoder 116 is supplied to a transmitter 118 and then to a satellite uplink 121. By way of example in FIG. 2A, the encoder 116 operated by information provider 114-1 generates a digital data signal 122-1 and the encoder 116 operated by information provider 114-3 generates a digital data signal 122-3. Each signal 122-1, 122-2, and 122-3 is transmitted via a satellite 123 to a head-end installation 125 (see FIG. 2B). It is understood that there may be many information service providers in the system of the instant invention, and therefore a plurality of signals may be transmitted via satellite 123 to locations such as head-end installation 125. Although not shown, signals may be received at locations other than a head-end installation such as for example, at the locale of a direct broadcast satellite (DBS) subscriber. In addition, while the link between the information providers and the head-end installation is shown as a satellite link, the invention is not limited in this respect. Accordingly, this link may, for example, be a coaxial cable, a telephone network, a satellite system, a radio frequency (RF) link, or an optical fiber or any combination thereof. Further, while the information providers of FIG. 2A are remotely located from head-end installation 125, one or more information providers may be physically located at the same site as head-end installation 125.

Each information service provider preferably has its own unique service provider identifier and, further, its own public key, which is, as described above, entrusted to the trusted entity which may operate head-end installation 125. Moreover, the service provider retains its own private key. Similarly each subscriber has a public key and a private key. Moreover, messages transmitted by either to the other may be signed, or certified as to accuracy. Data that is to be individually addressed to a subscriber is preferably encrypted with a key rendering it unaccessible to a service pirate. The data may include service authorization data, encrypted with a key, that is received eventually at a secure microprocessor, decrypted and stored in secure non-volatile memory, according to the present invention, in non-volatile storage cells (NVSC's) of predetermined length.

To summarize, a service provider or a subscriber may be concerned about two issues: privacy of communications (for example, from pirates or others) and 2) certification, that is, that a document or message or data is received without tampering and is certified (or verified) as to its source. According to the present invention, the same secure microprocessor or controller of a home communications terminal may be equally used to achieve both certification and privacy objectives with economies in program memory utilization.

Referring to FIG. 2B, a satellite down-link 124 at head-end installation 125 provides received signals 122-1, 122-2, and 122-3. Head-end installation 125 serves as a communications hub, interfacing to the various information providers, and connecting them on a conditional basis to subscriber locations 120-1, . . . , 120-m. Moreover, head-end installation 125 may be the location of the trusted entity referred to above. For example, received digital data signal 122-1 is supplied to a receiver 126-1 and then to a modulator 128-1, where it is modulated onto a distinct cable channel. Modulator 128-1 may employ any suitable modulation technique such as quadrature partial response (QPR) modulation. Received analog television signal 122-2 is supplied to a receiver 126-2, then to a scrambler 130 for scrambling, and then to a modulator 128-2, where it is modulated into a distinct cable channel. As will be discussed in detail below, scrambler 130 also inserts in-band data into analog television signal 122-2. It will be apparent that additional receivers, modulators, and, optionally, scramblers may be similarly provided for digital and analog information signals received from other information providers, either local or remote (not shown). Moreover, while the present invention is described in the context of a cable television terminal, the present invention may be suitably utilized in a direct-to-home satellite terminal, a direct broadcast satellite terminal, a digital audio service terminal or other subscriber information terminal.

Received digital data signal 122-3 is provided to an information signal processor (ISP) 142 so that it may be transmitted using so-called in-band or out-of-band transmissions. Other data streams (not shown) from other information providers may also be provided to ISP 142. ISP 142 is responsible for receiving the one or more data signals and then transmitting data to the subscriber terminal locations as will now be described. ISP 142 provides data to scrambler 130. ISP 142 may provide data to additional scramblers depending on factors such as the amount of data to be transmitted and the speed at which the data must be supplied and updated. Data is repetitively sent out by scrambler 130. If there is only one scrambler and a large amount of data, the repetition rate will be slow. Use of more than one scrambler allows the data repetition rate to increase.

Specifically, scrambler 130 places data in-band for transmission to subscribers, along with scrambling the associated analog television signal 122-2. In one arrangement, data is placed in the vertical blanking interval of the television signal, but data may be placed elsewhere in the signal and the invention is not limited in this respect. For example, data could be amplitude modulated on a sound carrier as is well known. As herein described, in-band transmission means the transmission of data within the video television channel comprising both audio and video carriers. Thus, the data from ISP 142 may be transmitted by amplitude modulation on the sound carrier, hereinafter in-band audio data, or in the vertical or horizontal blanking periods of an analog television signal, hereinafter in-band video data. ISP 142 may also be arranged to supply the data for transmission during unused portions a digital data stream such as an MPEG compressed video data stream.

ISP 142 can also receive and/or generate information locally. For example, ISP 142 may generate messages for transmission to subscribers concerning upcoming events or service interruptions or changes. Such messages need not be encrypted. If received from an information service provider, the information may either be transmitted as received or be reformatted by ISP 142, then supplied to scrambler 130 for transmission to subscribers. Moreover, according to the present invention, especially sensitive information, such as service authorization information, is preferably encrypted at the premises of the service provider prior to transmission to the subscriber.

ISP 142 also passes information to a head-end controller ("HEC") 132, which is connected to scrambler 130 and an out-of-band transmitter 134. Although HEC 132 is illustrated as being connected to the same scrambler as ISP 142, HEC 132 may in fact be connected to a different scrambler or scramblers. HEC 132 may conveniently be a Scientific-Atlanta Model 8658 for controlling transmission of data to scrambler 130 and out-of-band transmitter 134. As noted above, scrambler 130 places data in-band for transmission to subscribers, along with scrambling an associated television signal. Out-of-band transmitter 134 transmits information on a separate carrier, i.e., not within a channel. In one implementation, the out-of-band carrier is at 108.2 MHz, but other out-of-band carriers may also be used. The information transmitted under the control of HEC 132 may, for example, be descrambling data. In one arrangement, information is inserted in each vertical blanking interval to indicate the type of scrambling employed in the next video field. Scrambling systems are well known in the art. For example, sync suppression scrambling, video inversion scrambling, and the like, or some combination of scrambling techniques may be used.

In accordance with the present invention, authorization information can be signed with an electronic signature and portions of the message transmitted encrypted for receipt by a secure terminal processor. Authorization information authorizes subscribers to receive certain channels, events, programs or tiers of services. As used herein, programs is intended to generically refer to subscription information services having predetermined channel and time slots although, the concept may be expanded to include other information service marketing schemes as well. Tiers are used to define a level of service, for example, encompassing multiple data channels and time slots. One example of a tier may be arcade mode game playing, whereby a subscriber may have access to any video game (a plurality of game channels) over a long period of time, such as a Saturday. Events may be defined in the form of channels and time slots as well while channels may be low speed data channels (for ticker services) or high speed data channels for high definition television and surround-sound audio.

Information from ISP 142 and/or HEC 132 may also be transmitted over non-scrambled channels via data repeaters (not shown) such as a Scientific-Atlanta Model 8556-100 data repeater as either in-band audio or video data.

Some of the transmitted information is global, i.e., it is transmitted to every subscriber. For example, the descrambling data may be a global transmission. It is noted that just because each subscriber receives the descrambling data does not mean that each subscriber terminal unit can descramble a received signal. Rather, only authorized subscriber terminal units are capable of descrambling the received signal. On the other hand, some information transmissions may be addressed transmissions. For example, authorization information would normally be addressed to individual subscribers. That is, when transmitted, the data will have an address (for example, a subscriber terminal unit serial number) associated with it. The addressed subscriber terminal unit receives the information and, if there is a match between its address and the address contained in the message, responds accordingly. Other subscriber terminal units will ignore the data. Further, there can be group addressed data, which will affect groups of subscriber terminal units.

The outputs of modulators 128-1, 128-2, any additional modulators, and out-of-band transmitter 134 are supplied to a combiner 136 that combines the individual channels into a single wide-band signal that is then transmitted via distribution network 138 to a plurality of subscriber locations 120-1, . . . , 120-m (see FIG. 2C). Distribution network 138 may include, for example, one or more optical transmitters 140, one or more optical receivers 141, and a coaxial cable 144.

As indicated in FIG. 2B, subscription television system 100 may include a plurality of head-end installations which each provide information to locations in a particular city or geographic region. A central control 146 may be provided to coordinate the operation of various head-end installations in subscription television system 100. Central control 146 is often associated with the central office of a multi-service operator and may communicate with and control head-end installations in many cities. Central control 146 includes a system control computer 148 that directs the other components of central control 146. In accordance with the present invention, control computer 148 typically maintains secure any information service provider specific information such as key certificates, keys and identifiers and may, likewise with head-end 125 comprise a trusted entity according to the present invention. One example of a system control computer 148 is a Scientific-Atlanta System Manager 10 network controller. Another of the S-A Conditional Access Mgt. Controller. Central control 146 may, for example, provide billing services for the service provider, including billing for pay-per-view events. A billing computer 150 stores billing data and may also format and print bills. Communication between system control computer 148 and HEC 132 may be via modem, although the invention is not limited in this respect. Authorization data may be transmitted from system control computer 148 to HEC 132. HEC then 132 appropriately formats the authorization data and transmits the formatted authorization data to subscriber terminal units either in-band through scrambler 130 or out-of-band through out-of-band data transmitter 134 as discussed above.

Head-end installation 125 also includes an RF processor 152 for receiving reverse path data communications from subscriber locations 120-1, . . . , 120-m. Alternatively, reverse path communications may be received via telecommunications facilities and be served by a telephone processor (not shown). These data communications may include billing information fir impulse-pay-per-view purchases which may be forwarded to system control computer 148 and may also include subscriber requests for database information maintained at head-end installation 125. For example, a database server 154 such as an Oracle ® database server may provide access to reference materials such as encyclopedias, atlases, dictionaries, and the like. The subscriber request is forwarded from RF processor 152 to an information request processor 156 which accesses database 154 for the requested information and forwards the requested information to the requesting subscriber, for example, via an addressed in-band or out-of-band transaction as described above. In addition, information request processor 156 may also access a communications network 158 in order to provide subscriber access to services such as the Internet.

As the amount of the data transmitted between the head-end installation and the subscriber locations increases, increased use will likely be made of out-of-band and digital transmission. For example, 50 MHz of bandwidth may be dedicated to digital data (non-video) transmission, both forward channel (to the subscriber terminal unit) and reverse channel (from the subscriber terminal unit). Two hundred MHz or more may also allocated to digital video and 300 MHz to 500 MHz may be allocated for analog video. Accordingly, although various illustrative transmission techniques are discussed above, the present invention is not limited in any respect by the manner in which information is communicated between the head-end installation and the subscriber locations.

The previous explanation of a system according to FIG. 2B implies that the present invention may be adapted for application in a combination analog/digital system as described. Likewise, the present invention may be retrofitted into earlier known systems which may be considered analog systems. Referring now to FIG. 2C, there is shown a digital system in which communications between service providers and the trusted entity, between the service providers and the subscribers (the home communications terminals), and other combinations of possible communications occur via a public or private, switched or non-switched interactive data network or combination of such networks. According to FIG. 2C, a plurality of service providers SP1 . . . SPn communicate with a Trusted Entity and a plurality of home communications terminals HCT1 . . . HCTm over a switched or un-switched interactive network shown as a cloud. Typically, in such networks, for example, those operating under asynchronous transfer mode (ATM) criteria, packets of data, including headers, are transmitted addressed from, for example, SP1 to HCT2, without particular regard as to the direction or path the data packet follows to its destination. At a receiver, for example, a home communications terminal, the packet is received, certified as to signature, decrypted as necessary and acted upon as appropriate according to embedded control data or predetermined algorithms stored in program memory. Furthermore, plural packets may be collected, reformatted into the order in which they may be interpreted together as a message and then acted upon. In other words, it may not be of any concern to a receiver whether packet 1 transmitted first is in fact received last in relation to related packet 2. The receiver is programmed to collect the data of all related packets and acknowledge their non-receipt if packets are missing or not certifiably accurate according to such ATM or other protocols. Of course, other data communications protocols may be adaptively used to advantage in the context of the present invention besides ATM. Moreover, it is to be understood that any of the trusted entity, a service provider location or a location of a home communications terminal may be a transmitter or a receiver; moreover, messages which may comprise a plurality of data packets may be individually, group, or globally addressed.

Figure 2D:
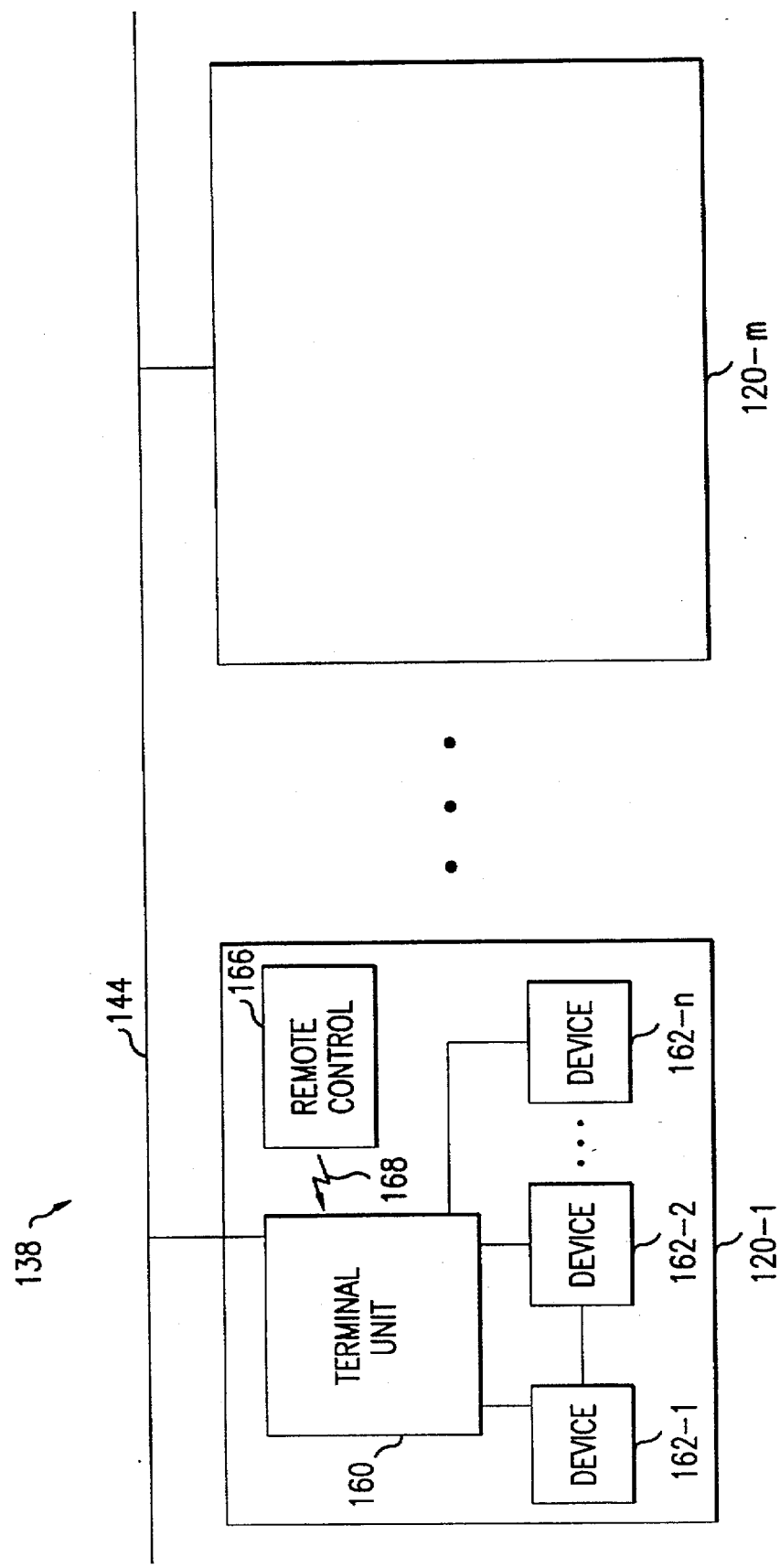

Referring to FIG. 2D, each subscriber location 120-1, . . . , 120-m includes a subscriber terminal unit 160 connected to distribution network 138. "Subscriber location" as used herein refers to any location which is remotely located with respect to head-end installation 125. In accordance with the instant invention, a subscriber terminal may, for example, be located in a home, a classroom, a hotel room, a hospital room, or an office. Each subscriber terminal unit 160 may be coupled to one or more devices 162-1, . . . , 162-n. Devices 162-1, . . . , 162-n may include devices which are capable of being operated in response to user-supplied commands and the instant invention is not limited in this respect. Thus, the devices may include televisions, stereo receivers, video cassette recorders (VCRs), audio cassette recorders, compact disc (CD) players, video disc players, video game players, personal computers, energy controllers and the like. Certain ones of the devices may be operatively connected together. Thus, as shown in FIG. 2D, device 162-1 is connected to device 162-2. For example, device 162-2 may be a television and device 162-1 may be a video cassette recorder. For purposes of discussion, it will be assumed that device 162-1 is a video cassette recorder and that device 162-2 is a television. One or more of devices 162-1, . . . , 162-n may be connected to switched power outlets of subscriber terminal unit 160, whereby subscriber terminal unit 160 may internally effect the on and off switching of these devices. A remote control unit 166 communicates information to subscriber terminal unit 160 over a communication link 168. Communication link 168 may, for example, be an infrared link.

Figure 3:
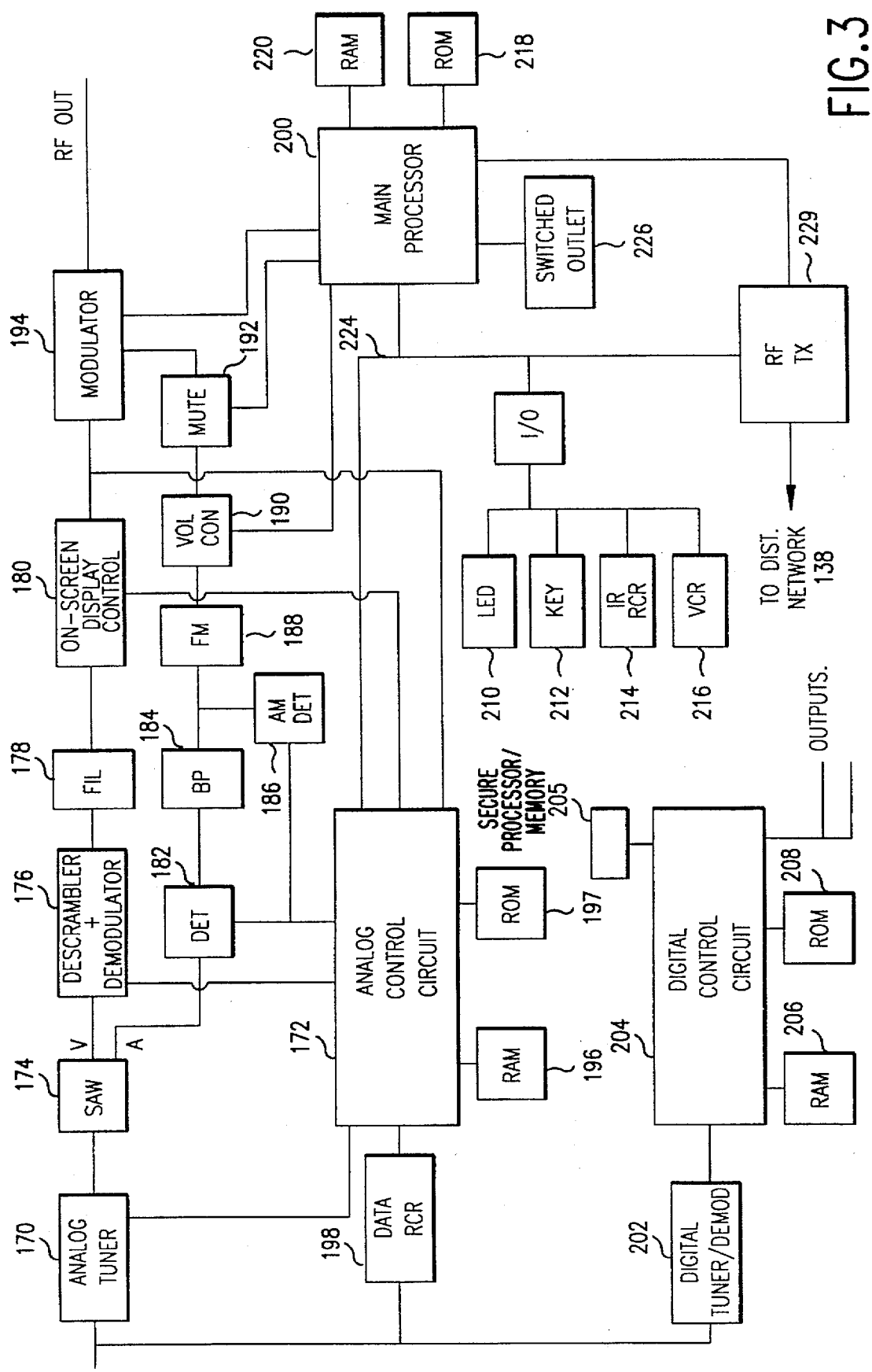
FIG. 3 is a detailed block diagram of subscriber terminal unit 160 shown in FIG. 2C.

FIG. 3 is a detailed block diagram of subscriber terminal unit 160 showing a combination of analog and digital technologies. The terminal of FIG. 3 is merely representative of one terminal in which the present invention may be utilized to advantage. A representative all-digital terminal would be one in which all analog channel tuning is eliminated and digital service data and related is received via ATM, time division multiplexed (TDM), pulse coded modulation (PCM), combination frequency-division multiplex/TDM systems, and other related data transmission means or combinations thereof.

The wide-band signal from communications network 138 is supplied to an analog tuner 170, a data receiver 198, and a digital tuner 202. Analog tuner 170 and digital tuner 202 are tunable according to a channel selected by a subscriber. Analog tuner 170 is tunable, for example, over a frequency range of 54 MHz to 550 MHz and can be tuned to a predetermined "off-channel" for receiving in-band data when television 160-2 is switched off. This so-called off-channel may be predetermined by system control computer 148 (see FIG. 2B) and data identifying the predetermined channel may be forwarded to subscriber terminal unit 160 using any one of the data transmission techniques described above. The off-channel identification data may be stored in memory of subscriber terminal unit 160. Preferably, only one of the analog and digital tuners is active at a given time.

Analog tuner 170 uses a phase-locked loop under the control of analog control circuit 172 to convert the selected or predetermined off channel signal to a 45.75 MHz intermediate frequency (IF) signal. Analog control circuit 172 may, for example, be an application specific integrated circuit (ASIC) which combines a plurality of subscriber terminal unit control and data handling functions into a single unit. Of course, the analog ASIC may include any combination of individual control circuits. Alternatively, or in addition, other control circuitry may be used, such as a microprocessor. Analog control circuit 172 has an associated RAM 196 and ROM 197.

A filter 174, for example, a SAW filter, filters the IF signal from analog tuner 170 to split the signal into separate video and audio portions for processing. The video portion is demodulated and descrambled by video demodulator and descrambler 176 under the control of analog control circuit 172. For example, if sync suppression scrambling has been used, video demodulator and descrambler 176 may perform sync restoration. The video signal then passes through a bandpass filter 178 to an on-screen display control 180 where inverse video inversion (descrambling) takes place, if necessary. The descrambling of the video portion, whether sync suppression, sync inversion, video line inversion, and the like, is under the control of analog control circuit 172. Thus, analog control circuit 172 supplies to on-screen display control 180 any necessary timing signals, inversion axis levels, and information about whether the video is inverted and supplies to video demodulator and descrambler 176 any necessary timing, restoration levels, and identification of sync pulses to be restored. Analog control circuit 172 receives the descrambling data for implementing such control, for example, from pulses as in-band audio data or from data modulated on the video during the vertical blanking interval.

In the other path, the audio signal is converted to the intermodulation frequency of 4.5 MHz by a synchronous detector 182. Feedback for automatic gain control of synchronous detector 182 is supplied from the output of a bandpass filter 184. An amplitude modulation detector 186 performs pulse detection to recover in-band audio data which is amplitude modulated onto the audio carrier. The detected in-band audio data is supplied to analog control circuit 172. The in-band audio data, except for descrambling data, is stored in RAM 196 for buffering. The descrambling data is directly accessed by analog control circuit 172 for the above-described descrambling operations. The audio signal from bandpass filter 184 is demodulated by an FM demodulator 188. Volume control of the audio signal is performed under control of a volume control circuit 190 and a main processor 200 as described, for example, in commonly assigned U.S. Pat. No. 5,054,071, which is incorporated herein by reference. After volume control, the audio signal is supplied to a mute switch 192 which is under the control of main processor 200. The output of mute switch 192 is supplied to a modulator 194.

The output of on-screen display control 180 is supplied to analog control circuit 172 for detecting in-band video data from the blanking intervals of the signal. Analog control circuit 172 stores the detected data in RAM 196 prior to processing by main processor 200. As noted above, any descrambling data is directly accessed by analog control circuit 172 for the above-described descrambling operations. Additional details of the detecting of this in-band video data can be found in commonly assigned copending application Ser. No. 08/229,805, filed Apr. 19, 1994, entitled "Subscription Television System and Terminal for Enabling Simultaneous Display of Multiple Services", which is incorporated herein by reference. Further, time-of-day data is transmitted from head-end installation 125 and stored in RAM 196, for example. For example, global time-of-day transmissions may periodically occur, based on satellite time standards as described in commonly assigned U.S. Pat. No. 4,994,908, which is incorporated herein by reference. Thus, main processor 200 has access to current time-of-day information.

On-screen display control 180 selectively generates on-screen character and graphics displays in place of or overlaid on the video signal. For example, information stored in RAM 196 or ROM 197 may be read out to on-screen display control 180 and used to generate on-screen characters and/or graphics. Modulator 194 combines the output of on-screen display control 180 and the audio signal from the output of mute switch 192 and converts the combined signal to the channel frequency selected by main processor 200, such as channel 3 or 4. The combined and remodulated signal is supplied as an RF output to VCR 162-1 and/or to television 162-2 in a well known manner.

The input wide-band signal is also supplied to out-of-band data receiver 198 for receiving commands and data. Out-of-band data receiver 198 provides received out-of-band data to analog control circuit 172. This data may be stored in RAM 196 where it is accessible by main processor 200.

The input wide-band signal is also supplied to a digital tuner/demodulator 202 which is tunable in a range, for example, from 400 MHz to 750 MHz and is tuned in accordance with a subscriber selection. Digital tuner/demodulator 202 is used to tune to digital data channels. A digital control circuit 204 which may include a digital ASIC recovers and processes the digital data on the tuned digital data channel and supplies corresponding analog and/or digital output signals to one of devices 162-1, ..., 162-n. Alternatively, the recovered digital data may be accessed by one of devices 162-1, ..., 162-n. For example, if the digital data includes digital audio data, corresponding analog output signals may be supplied to speakers. If the digital data is video game data, a video game player may access the recovered digital data which is stored in RAM 206, for example, through a video game player port (not shown). If the digital data includes digital television data, corresponding analog output signals may be supplied to VCR 162-1 and/or to television 162-2. If the digital data includes software programs, a personal computer may access the recovered software programs through a serial port. Details of digital control circuits which may be used to recover and process digital data may be found, for example, in commonly assigned U.S. Pat. No. 5,239,540 to Rovira; commonly assigned U.S. application Ser. No. 08/352,162, entitled "Secure Authorization and Control Method and Apparatus for a Game Delivery Service"; and commonly assigned U.S. application Ser. No. 07/970,918, entitled "System and Method for Multiplexing a Plurality of Digital Program Services for Transmission to Remote Locations." Each of these patents or applications is incorporated herein by reference thereto. Digital control circuit 204 also has an associated RAM 206 and ROM 208.

Coupled also to digital control circuit 204 is secure processor 205 including secure non-volatile memory. Typically, a secure microprocessor with public key support has approximately four thousand bytes of on-board non-volatile memory. This capacity figure is used by way of example for the purposes of demonstrating the feature of the present invention whereby precious non-volatile memory is reconfigurable and efficiently utilized. The present invention may be equally utilized to advantage to conserve larger or smaller memories. Of the present exemplary four kilobytes of memory, some is reserved for storage of a private key, control algorithms and the like. This leaves room for approximately 80 non-volatile storage cells (NVSC's) of predetermined length, for example, forty bytes. Again, this allocation is by way of example only, there may be greater or fewer than 80 cells and greater or fewer than 40 bytes per cell (100 cells, 32 bytes per cell; 60, 50; or other arrangement depending on the application of the present invention). Moreover, it is a principle of the present invention, that remaining memory for, for example, program memory may be efficiently allocated for, for example, both electronic signature on message certification and decryption privacy.

Processor 205 is preferably inside the same housing as the rest of the terminal of FIG. 3, but, in alternative embodiments, may comprise a smart card or other secure processor/memory as described by U.S. Pat. No. 5,029,207 and 5,237,610 incorporated herein by reference. Such a smart card is plug-in insertable to a slot adapted to receive it and may be magnetically, optically or otherwise read and/or written to.

Although digital tuner 202, digital control circuit 204, secure processor 205, RAM 206, and ROM 208 are shown as being integral with the remaining circuitry, these elements individually, in combination or in subcombinations thereof may alternatively be provided as an add-on or sidecar unit which is connectable to main processor 200 via an expansion slot connected to processor bus 224. In any of the smart card, side car or internal to terminal embodiments, encryption and decryption of commands and data are performed within processor 205 and data is stored therein in the clear. One of the characteristics of a secure processor is that once a pirate would attempt to break into the processor to seek to obtain the data stored therein, the memory may be lost and, of course, the processor functionally rendered inactive.

Subscriber terminal unit 160 further includes an LED display 210 for displaying information such as channel numbers, a keypad 212 for inputting subscriber commands, an infrared receiver 214 for receiving commands from remote control 166, and a VCR control 216 for transmitting commands to VCR 162-1 by, for example, IR signals. An RF transmitter is controllable by main processor 200 for transmitting reverse path transmissions over distribution network 138. These transmissions may be generated in response to subscriber-supplied inputs for requesting information from database 154 at head-end installation 125 or for the purpose of transmitting billing information regarding impulse pay-per-view purchases to system control computer 148, the latter being preferably encrypted in accordance with the present invention and stored in processor 205. A switched power outlet 226 may be provided to selectively power one or more of devices 162-1, . . . , 162-n plugged therein.

Main processor 200 is preferably a PowerPC ® or like microprocessor and controls the overall operation of subscriber terminal unit 160 in accordance with program code stored in memory (e.g., ROM 218 and RAM 220) and with data downloaded from head-end installation 125.

Referring now to FIG. 4A–4D, secure non-volatile storage cells (NVSC's) of secure processor 205 of FIG. 3 will be explained in further detail. Referring first to FIG. 4A, there is shown a typical NVSC or memory block of predetermined length, for example, forty bytes of non-volatile memory such as EEPROM of secure microprocessor 205. This is a software construct than can be predetermined to any suitable length, forty bytes being one example. Preferably the NVSC is a group of contiguous bytes for ease of memory access. One byte may comprise a shared byte for type and status data as will be further described in connection with FIG. 4B. Another byte may be spare or reserved. Thirty-six bytes of data then follow. Lastly there is a pointer to the next NVSC in a list of allocated or empty memory blocks.

All valid NVSC's are linked. There always exists a pointer maintained external to the preferably contiguous NVSC array which points to the first valid NVSC and each valid NVSC points to the next valid NVSC in the list. The pointer in the last NVSC of a list contains the value 0xFFFF. Similarly, all empty NVSC's are linked, with an external pointer to the first empty memory block on the empty list. The first empty cell on the list is found by using the external address pointer. The Status data field is changed to "writing" except if there is already data stored in the memory block, then the status is "changing". Once the NVSC is written the status data field is changed to "valid". A cell (NVSC) is removed from a linked list by replacing the pointer of the previous cell with the address of the following cell.

Referring now to FIG. 4B, there is shown a representative type/status byte comprising eight bits. Four bits comprise type information as further described by FIG. 4C and four bits comprise status information as further described by FIG. 4D.

Referring to FIG. 4C, the type field indicates what type of NVSC data the block is. The memory block (NVSC) may comprise a service provider SP descriptor block, a multi-session key (MSK) block, a large tier map, (a small tier map), a large program map, a small program map, an individual programs authorizations list (for example, eight programs maximum) or an impulse pay-per-view events list (also, for example, eight events). Four bits of data provide a maximum of sixteen choices. Other possible service authorization and purchase NVSC's may come to mind for different services, such as digital game services or digital audio services. Some of these secure data comprise authorization or service acceptance data that should be preserved from service pirates and must be returned to the service provider for billing. An advantage then of the present invention is that an electronic signature of a subscriber and encryption of such service acceptance related data with a subscriber's key may be accomplished within the secure processor and any data accessible to a service pirate would be unintelligible to the pirate since it is encrypted. One exemplary arrangement is shown in FIG. 4C, whereby type value 0001 represents a large tier map of up to 256 levels of service that may be provided by a particular service provider. Allowing 32 bytes for the large tier map, 2 bytes for a SP identifier and 2 bytes for a transport stream identifier, the large tier map utilizes 1 NVSC. Other NVSC type values identified by way of example only are likewise defined. Type value 0000 is an error indicator. Type value 0011 represents a small portion of a 4096 channel authorization map, equivalent to 1/16 of a such a map. Other arrangements may come to mind for different applications of the present invention. A modified NVSC type list is shown in FIG. 5.

Referring to FIG. 4D, the status field indicates what the status of the memory block is at a given point in time. The status may be changing, may be valid (i.e., in use), writing or a member of the empty list. In an alternative embodiment, the type status byte may be appropriately shared to permit, for example, five bits of type data and three bits of status data. Again, the byte sharing example is merely that, an example of what may be adapted for use in accordance with the principles of the present invention. As shown by the present example, most bit positions for status value are not valid and may be wasted.

Now an example of the present invention will be described in the context of FIGS. 5, 6 and 7. Firstly, FIG. 5 shows exemplary NVSC types. For example, the Service Provider (SP) Descriptor block comprises a complete description of the service provider by identifier (two bytes), a public key hash of 16 bytes, up to two channel authorizations (two channels identified by 8 bytes, four bytes each), other SP characteristics (8 bytes) and an NVSC pointer of two bytes to the next NVSC. Alternatively, the channel authorizations may be bit mappable to predetermined data channels for the service provider and comprise a bit authorization map for up to sixty-four channels.

Another memory block may be for storage of the multi-session key (MSK) for a particular service provider. Even and odd MSK's may be provided to further thwart pirates as is well known in the art, each 16 bytes long. In this same memory block may be stored a Service Provider ID and a Transport data Stream Identification (TS ID) of two bytes to identify the transport data stream the data is received on.

Other memory blocks are defined as shown in FIG. 5 (or FIG. 4C in a modified embodiment), for example, for defining 256 levels of service (large tier map), 4096 channels (large) or 256 (small), advance purchased events and impulse pay-per-view events. The purchased impulse pay-per-view events are representative of subscription information service acceptance data and preferably are encrypted and transmitted in a secure manner via reverse path means, RF or telephone, for example. A user or subscriber registers service acceptance data (which may be home shopping data) via the terminal of FIG. 3, for example, by remote control including a personal signature or personal voice recognition. Such data is not erased from secure memory of processor 205, preferably, until acknowledgement has been received via billing computer 150 (FIG. 2B) that the service acceptance data has been successfully registered at the billing computer.

Figure 6:
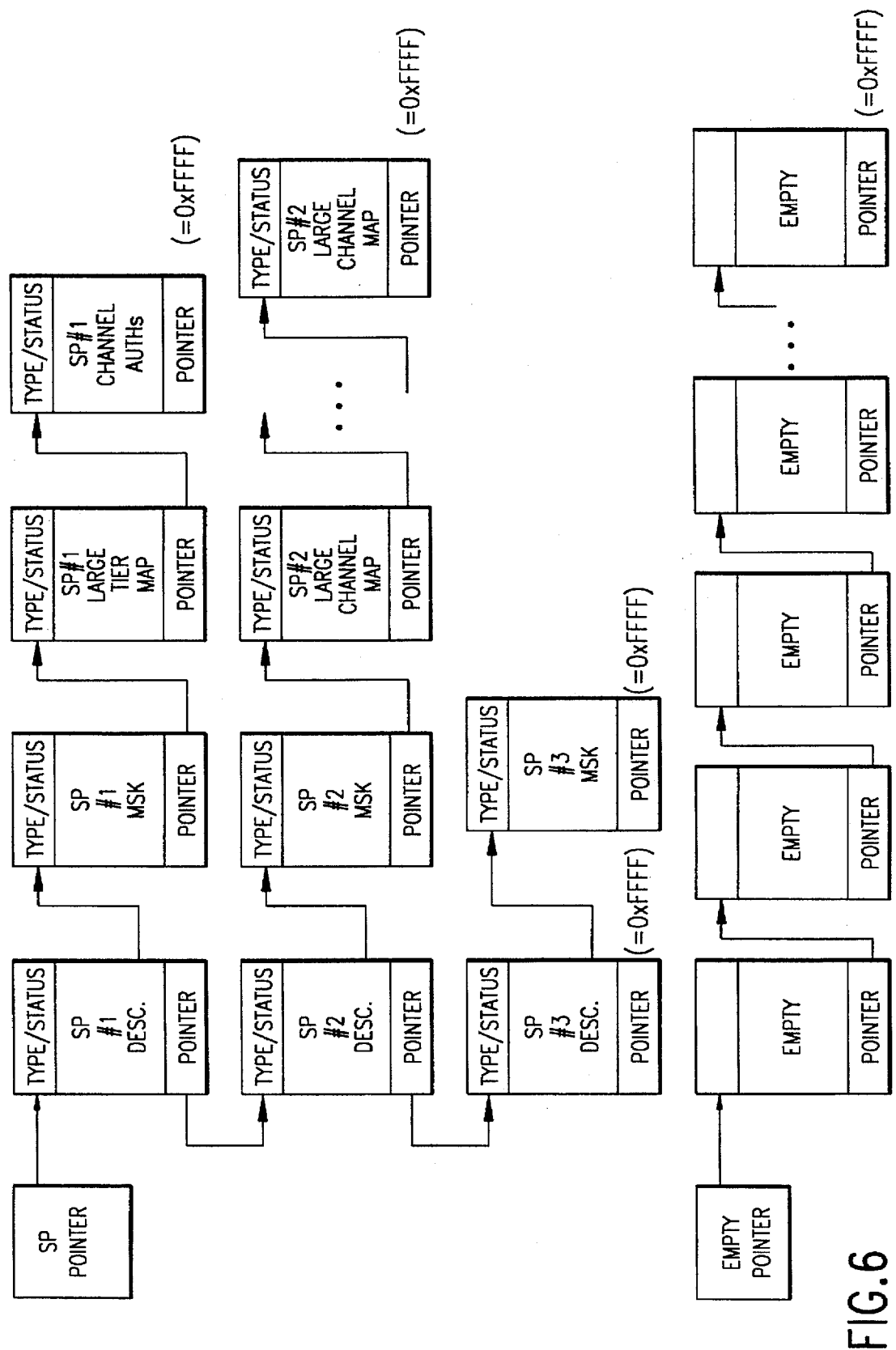
FIG. 6 is a block diagram of an exemplary linked list for multiple service provider access to terminal memory of the subscriber terminal unit of FIG. 3.

Referring now to FIG. 6, there is shown a linked list example showing how scarce non-volatile memory can be allocated and reallocated. We have assumed thus far that 80 NVSC's are available at a predetermined length of 40 bytes each. A single command or set of commands from a trusted entity is received to set up a service provider descriptor block and await further commands from the service provider. These first transactions from the trusted entity serve to certify to the subscription information terminal that the service provider is a valid service provider, once the message integrity and the trusted entity's signature is certified and that the terminal is authorized to receive communications directly from the identified service provider.

Typically, at least one memory block from the empty list is allocated to that service provider in the introductory transaction. The initial or series of service provider certifying transactions will communicate the service provider identifier, the service provider's key certificate, the service provider's key, the transport data stream or streams the service provider communicates over, and the maximum number of NVSC's that service provider will utilize of non-volatile memory. Similarly, when a service provider no longer wishes to provide service through the trusted entity, one or more commands are received and acted upon by secure processor 205 to erase the memory blocks for that service provider and return the memory blocks to the empty list. As already described, the end of a list may be predefined by the pointer 0xFFFF in hexadecimal.

Entering a service provider list at the top of FIG. 6, the service provider pointer may match a service provider identifier number in a first Service Provider Descriptor block. If there is no match, the chart follows to Service Provider #2 and to #3 in turn. It is assumed that there are only three valid service providers in this example.

Service provider #1 is a service provider which utilizes a multi-session key block, a large tier map block and a channel (program) authorization map (4 NVSC's).

FIG. 6 assumes that Service Provider #2 is a service provider which utilizes a multi-session key, and a very large channel map, comprising in this example, seventeen memory blocks.

FIG. 6 also assumes that Service Provider #3 is a so-called broadcast service provider which has no tier structure, no pre-purchase or impulse purchase capabilities and the like. Service Provider #3 only requires two memory blocks. Altogether, then, non-volatile memory of processor 205 comprising 80 memory blocks or NVSC's is only utilized to the extent of some 25 memory blocks leaving 55 memory blocks in an empty list.

FIG. 7 shows this result in the first column. The second column shows the application of the principles of the present invention to a recently announced field trial of cable television services known in the industry as the USWest Omaha Trial. There are a total of twenty-three service providers (each with a key block, these require 46 NVSC's) in this recently announced example. Fourteen of these require large tier maps. We also assume nine different eight channel authorization maps to authorize 72 channels. These then leave 11 NVSC's in an empty list.

Further examples are shown for a direct-to-home service provider (Ex #3) and other exemplary models. In this manner and by way of example, it has been shown that only 4 kilobytes of secure non-volatile memory may be utilized by multiple service providers in a secure, efficient manner and reutilized and reconfigured at the will and control of the service providers and the service subscribers without the intervention of the trusted entity (once the trusted entity has validated the relationship). All data for loading into the map is received, any electronic signatures certified, any data portion of a message that are encrypted, are decrypted in the secure micro and stored therein, unreachable to any service pirates. Any data leaving the secure microprocessor 205 may be likewise signed by the subscriber with a unique security object stored in secure memory and portions or all of the message encrypted with a subscriber key so the service provider will be able to readily certify the message and recover its included data and determine the existence of a service pirate attempting to interfere with reverse path communications. The present invention may prove useful in practically any subscription information service terminal, direct-to-home, direct broadcast satellite, as well as cable television, used by way of example only.

Also, while the present invention has been described in the context of a so-called analog/digital or wholly digital subscription information services terminal as per FIG. 3, the present invention may be adaptably retrofitted into certain existent cable television terminals such as the Scientific-Atlanta Models 8600 and 8600X and other similar terminals of other manufacturers with or without manufacturer intervention.

While the invention has been described in detail with reference to the appended drawings, the invention is limited in scope only by the claims. Moreover, any application herein should be construed to be incorporated by reference as to any subject matter deemed essential to the present disclosure.

We claim:

1. An information terminal comprising
    a data receiver for receiving commands and data,
    a processor for interpreting the commands and data, and
    reconfigurable memory, responsive to the processor, configured to store a plurality of blocks of data in memory blocks depending on the requirements of information providers, each said information provider being allocated at least one memory block, all unallocated memory blocks being linked in an empty, said empty list for organizing said unallocated memory blocks until they are requested by said information providers.

2. An information terminal as recited in claim 1 wherein said reconfigurable memory comprises non-volatile memory.

3. An information terminal as recited in claim 1 wherein said processor comprises a secure microprocessor.

4. An information terminal as recited in claim 1 wherein said data receiver receives data individually addressed to the information terminal.

5. An information terminal as recited in claim 1 wherein said at least one memory block comprises data related to the service provider.

6. An information terminal as recited in claim 5 wherein said data related to the service provider comprises a service provider key received from the entity.

7. An information terminal as recited in claim 5 wherein said data related to the service provider comprises a service provider identifier.

8. An information terminal as recited in claim 5 wherein said data related to the service provider comprises service authorization data for an information service subscriber.

9. An information terminal as recited in claim 1 wherein said commands and data comprise a first command for receiving and storing validating key data for a service provider.

10. An information terminal as recited in claim 9 wherein said commands and data comprises a second command authorizing the terminal to receive addressed messages from the service provider.

11. An information terminal as recited in claim 1 wherein each said memory block comprises a predetermined length.

12. An information terminal as recited in claim 1 wherein said reconfigurable memory is further adapted for storing data related to certification of electronic signatures.

13. An information terminal as recited in claim 1 further comprising a message transmitter and wherein said processor is adapted for generating an electronic signature for messages for output via said message transmitter.

14. A method for reconfiguring a subscriber information terminal memory comprising the steps of
    receiving a first command for storing a key certificate for a service provider,
    storing said key certificate in terminal memory,
    receiving a second command authorizing the information terminal to receive messages from the service provider,
    receiving a third command for storing a public key for the service provider, and
    storing said public key in a memory block of terminal memory for the service provider, the memory block obtained from an empty memory block list.

15. A method as recited in claim 14 wherein said third command and subsequent commands for writing authorization data are addressably transmitted from the service provider to the subscriber terminal.

16. A method as recited in claim 14 wherein said memory is secure and said authorization data is received with an electronic signature, said electronic signature certified via a secure processor prior to storage.

17. A secure terminal memory comprising a plurality of non-volatile storage cells of predetermined length, the storage cells being linked together by pointers, access to said memory controlled by a secure processor, at least one said non-volatile storage cell being allocated to a particular service provider, unallocated ones of said memory cells being preserved in an empty list.

18. A secure processor including a secure terminal memory as recited in claim 17, said secure processor for receiving communications from the particular service provider including an electronic signature and writing authorization data into the secure terminal memory upon communication certification.

19. A secure processor including a secure terminal memory as recited in claim 17, the processor for outputting service provider related data for transmittal with a subscriber electronic signature to the particular service provider.

20. A secure processor as recited in claim 19 wherein said service provider related data comprises service purchase data.

21. A method of communicating subscription information service related data for use in a subscription information system comprising the steps of
    storing a key certificate at a trusted entity,
    certifying to a subscription information terminal the identity of a subscription information service provider, and
    responsive to the certification step, receiving messages at the subscription information terminal from the information service provider.

22. A method as recited in claim 21 wherein said messages from the information service provider include data encrypted according to a key of the information service provider and said messages are decrypted within a secure processor of the subscription information terminal.

23. A method as recited in claim 21 further comprising the steps of generating messages for transmission to the information service provider, the messages including an electronic signature of the subscriber.

24. A method as recited in claim 21 further comprising the subsequent steps of receiving at the service provider a message from the terminal, certifying the message as to its source and decrypting encrypted portions of the message that are received.

* * * * *